(12) United States Patent
Boyd

(10) Patent No.: US 11,454,327 B2
(45) Date of Patent: Sep. 27, 2022

(54) METHODS AND SYSTEMS ASSOCIATED WITH A HIGH PRESSURE VALVE SYSTEM

(71) Applicant: Commando Pressure Control Inc., Houston, TX (US)

(72) Inventor: Joseph Boyd, Katy, TX (US)

(73) Assignee: Commando Pressure Control, Inc., Houston, TX (US)

(*) Notice: Subject to any disclaimer, the term of this patent is extended or adjusted under 35 U.S.C. 154(b) by 0 days.

(21) Appl. No.: 17/380,110

(22) Filed: Jul. 20, 2021

(65) Prior Publication Data

US 2022/0042609 A1 Feb. 10, 2022

Related U.S. Application Data

(60) Provisional application No. 63/062,780, filed on Aug. 7, 2020, provisional application No. 63/074,756, filed on Sep. 4, 2020.

(51) Int. Cl.
| | |
|---|---|
| *F16K 5/20* | (2006.01) |
| *F16K 5/06* | (2006.01) |
| *E21B 43/26* | (2006.01) |

(52) U.S. Cl.
CPC .......... *F16K 5/205* (2013.01); *E21B 43/2607* (2020.05); *F16K 5/0689* (2013.01); *F16K 5/201* (2013.01)

(58) Field of Classification Search
CPC .... F16K 5/0689; F16K 5/0678; F16K 5/0668; F16K 5/205; F16K 5/204; F16K 5/201; F16K 5/0673; F16K 5/207; E21B 43/2607; E21B 43/26
See application file for complete search history.

(56) References Cited

U.S. PATENT DOCUMENTS

| | | | | | |
|---|---|---|---|---|---|
| 2,653,004 | A | * | 9/1953 | Schnyder | ................ F16K 43/00 251/309 |
| 3,357,679 | A | * | 12/1967 | Gulick | .................. F16K 5/0673 251/315.13 |
| 3,380,708 | A | * | 4/1968 | Scaramucci | .......... F16K 5/0642 277/369 |
| 3,542,335 | A | * | 11/1970 | Scaramucci | .......... F16K 5/0673 251/315.15 |
| 3,556,474 | A | * | 1/1971 | Scaramucci | .......... F16K 5/0673 251/315.15 |
| 3,610,569 | A | * | 10/1971 | Reaves | ............... F16K 31/1225 251/52 |

(Continued)

FOREIGN PATENT DOCUMENTS

| | | | |
|---|---|---|---|
| DE | 2107921 A1 | * | 2/1971 |
| DE | 2556729 A1 | * | 6/1976 |

(Continued)

*Primary Examiner* — David Colon-Morales
(74) *Attorney, Agent, or Firm* — Pierson IP, PLLC

(57) ABSTRACT

A plug that contacts both an upstream seat and a downstream seat based on a upstream spring creating first forces on the upstream seat and a downstream spring creating second forces on the downstream seat. The first forces may be in a downstream direction and the second forces may be in an upstream direction. Additionally, the upstream chamber and the downstream chambers may be dependent pistons that are configured to create dynamic forces acting upon the plug.

18 Claims, 5 Drawing Sheets

(56) References Cited

U.S. PATENT DOCUMENTS

| | | | | |
|---|---|---|---|---|
| 3,617,025 A * | 11/1971 | Gerbic | ............... | F16K 5/205 |
| | | | | 251/315.08 |
| 3,749,357 A * | 7/1973 | Fowler | ............... | F16K 5/205 |
| | | | | 251/315.08 |
| 3,776,506 A * | 12/1973 | Fowler | ............... | F16K 5/205 |
| | | | | 251/315.01 |
| 3,856,261 A * | 12/1974 | Jourdan | ............. | F16K 5/205 |
| | | | | 137/112 |
| 3,901,474 A * | 8/1975 | Kubota | ............... | F16K 5/205 |
| | | | | 251/188 |
| 4,602,762 A * | 7/1986 | Koch | ............... | F16K 5/0673 |
| | | | | 251/315.13 |
| 4,762,301 A * | 8/1988 | Wozniak | ............ | F16K 27/067 |
| | | | | 251/315.14 |
| 4,911,408 A * | 3/1990 | Kemp | ............... | F16K 5/0673 |
| | | | | 251/315.08 |
| 10,801,627 B2 * | 10/2020 | Warbey | ............... | F16K 5/0673 |
| 2015/0300509 A1 * | 10/2015 | He | ..................... | F16K 5/201 |
| | | | | 251/174 |
| 2020/0232564 A1 * | 7/2020 | Karlsen | ............... | F16K 5/201 |

FOREIGN PATENT DOCUMENTS

| | | | | |
|---|---|---|---|---|
| DE | 2609316 A1 * | 10/1976 | | |
| DE | 19510709 A1 * | 9/1996 | ........... | F16K 5/0673 |
| FR | 2353775 A1 * | 12/1977 | | |
| FR | 2472124 A1 * | 5/1981 | | |
| FR | 2940828 A1 * | 7/2010 | ............... | F16K 5/14 |
| GB | 1422012 A * | 1/1976 | ............... | F15B 1/02 |
| WO | WO-2006091117 A1 * | 8/2006 | ............ | F16K 5/201 |

\* cited by examiner

METHODS AND SYSTEMS ASSOCIATED WITH A HIGH PRESSURE VALVE SYSTEM

CROSS-REFERENCE TO RELATED APPLICATIONS

This application is related to Provisional Application Nos. 63/062,780 filed on Aug. 7, 2020 and 63/074,756 filed on Sep. 9, 2020, which are fully incorporated herein by reference in its entirety.

BACKGROUND INFORMATION

Field of the Disclosure

Examples of the present disclosure relate to methods and systems associated with high pressure valves for the energy sector. Specifically, embodiments are directed towards a first valve assembly and a second valve assembly having pistons that are in communication with each other around a plug to allow for dynamic control over the pressure desired to set the plug.

BACKGROUND

High pressure valves utilize a metal-to-metal sealing mechanisms between the surface of a barrier, such as a gate or plug, and an adjacent surface, such as a seat or insert. High pressure valves commonly use a floating barrier design that allows the barrier to be positioned between the sealing surface of the seat on both sides. When no force is applied, a floating barrier should reside equally inside the valve body and between the seats without contacting any adjacent sealing feature. When forces are applied to the surface area of the barrier, the sealing surfaces of the barrier and the seat are in contact, and to engage the metal-to-metal seal.

However, relying solely on the metal-to-metal sealing mechanism in high pressure valve is unreliable and troublesome for several reasons. Namely, changing tolerances of the elements of the high pressure valve creates inconsistence performance, environmental impacts influence the elements of the high pressure valve, and when upstream forces cause the barrier to move, which exposes the valve body to sand and chemicals.

Accordingly, needs exist for systems and methods for a high pressure valve with an upstream seat and a downstream seat that are in communication with each other and are preloaded with hydraulic fluid based on a desired clamping force, wherein the hydraulic fluid creates dynamic and dependent pistons on both sides of a plug.

SUMMARY

Embodiments described herein disclose a high pressure valve with an upstream assembly, downstream assembly, and a plug. The upstream assembly and the downstream assembly may include a seat, chamber, spring, and communication port, wherein the plug is configured to be positioned between the upstream seat and the downstream seat.

In a starting position, the plug may be configured to contact both the upstream seat and the downstream seat based on the upstream spring creating first forces on the upstream seat and the downstream spring creating second forces on the downstream seat. The first forces may be in a downstream direction and the second forces may be in an upstream direction. Additionally, the upstream chamber and the downstream chambers may be dependent pistons that are configured to create dynamic forces acting upon the plug. The upstream chamber and the downstream chamber, housing the corresponding springs, may be pre-loaded with hydraulic fluid at a first PSI and a second PSI, respectively. The first PSI and the second PSI may be any desired PSIs, which may be the same or different, for additional clamping force against the plug. The first pressure within the upstream chamber may create forces against the upstream seat in the first direction, and the second pressure within the downstream chamber may create forces against the downstream seat in the second direction.

Responsive to applying fracturing pressure against the high pressure valve when the high pressure valve is in the closed position, the plug may shift towards the downstream seat moving the downstream seat in a first direction. When the downstream seat moves in the first direction, the spring may compress decreasing the size of the downstream chamber. This may cause hydraulic fluid in the downstream chamber to circulate to the upstream chamber via the communication port.

Responsive to the hydraulic fluid being communicated into the upstream chamber, the additional hydraulic fluid increase the PSI within the upstream chamber to create a piston to assist in moving the upstream seat in the first direction towards the plug. As such, the initial pre-loaded PSI associated with the downstream chamber may be displaced, and amplified, within the upstream chamber. This allows for the geometry of the dependent chambers and systems to be designed to multiply the pre-loaded PSI associated with the hydraulic fluid within the chambers.

In further embodiments, systems may include an energy system with an additional piston and hydraulic PSI. The energy system may be configured to increase the PSI within the upstream assembly or downstream assembly. The energy system may utilize the frac PSI pulled upstream from the high pressure valve within the casing, wherein the frac energy may be utilized during a fracing operation and is external to the pre-loaded PSI associated with the hydraulic fluid within the chambers. The energy system may convert the frac energy to hydraulic PSI within the chambers to increase the PSI associated with the upstream and/or downstream assembly. Specifically, when the energy system receives the frac energy, a piston within the energy system may move in a first direction. This may communicate the hydraulic PSI within the energy system to the chambers within the upstream assembly and/or downstream assembly to introduce more energy behind the seats to increase the clamping force on the plug. Further, as frac PSI is increased above the high pressure valve, more hydraulic pressure may be introduced within the chambers. When frac PSI is relived from the system, the piston associated with the energy system may move in a second direction to remove hydraulic PSI from the chambers.

Embodiments may be configured to assist a metal-to-metal sealing assembly of the high pressure valve by applying a self-sustaining clamping force, via two interconnected chambers on opposite sides of the plug, which does not require much human interaction during fracturing operation. The loaded springs and hydraulic pressure may be configured to force the upper seat and the lower seat to contact the plug in opposite directions along a central axis of the wellbore, and the applied clamping forces reduce the variance and tolerance issues in the high pressure valve. This increase valve performance and reliability, while also reducing risks, failures, and a need to replace parts.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
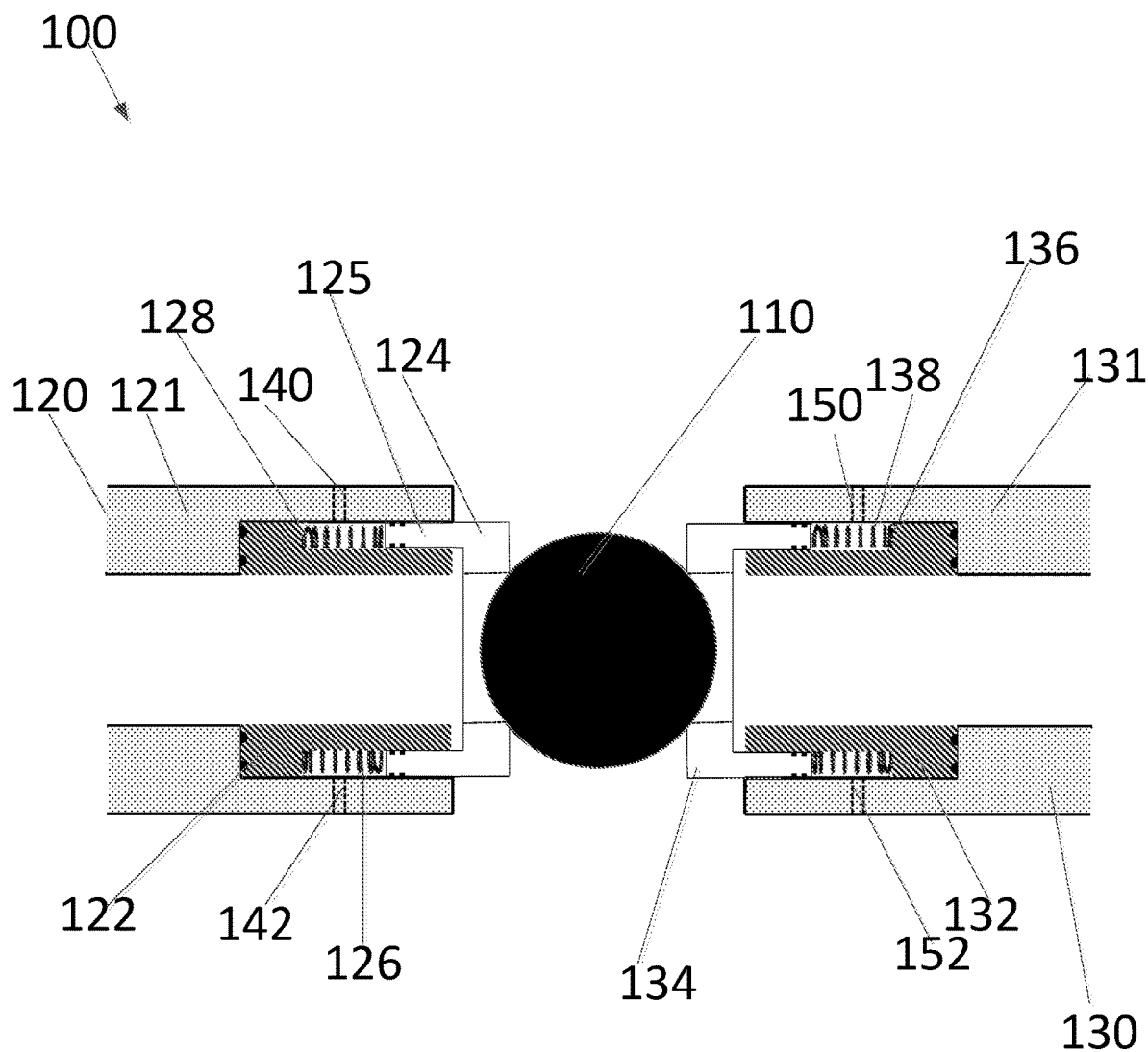
FIG. 1 depicts a high pressure valve, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

FIG. 1 depicts a high pressure valve 100, according to an embodiment. High pressure valve 100 may include plug 110, first assembly 120, and second assembly 130.

Plug 110 may be a device that is configured seal a pipe, tube, or any other conduit that is configured to selectively convey water, gas, oil, and other fluid substances. Plug 110 may be configured to rotate to open and close a plug port extending through plug 110. In an open position, plug 110 may allow fluids to cross high pressure valve 100 through the plug port. In a closed position, plug 110 may restrict or limit the flow of fluid across high pressure valve 100. Plug 100 may be configured to contact first assembly 120 and second assembly 130, and simultaneously receive dynamic and dependent forces created by first assembly 120 and second assembly 130.

First assembly 120 may be an upstream assembly that is positioned upstream from plug 110. First assembly 120 may include an outer housing 121, seat sleeve 122, seat 124, chamber 126, spring 128, upstream entry port 140, and upstream return port 142.

Outer housing 121 may be a device that is configured to house elements of first assembly 120, and control the movement of spring seat 128 via chamber 126.

Outer housing 121 may also include a first passageway that is configured to allow communication with chamber 126 via upstream entry port 140, and a second passageway that is configured to allow communication with chamber 126 via return port 142. Outer housing 121 may include an inner ledge that is configured to reduce the inner diameter of outer housing 121, wherein seat sleeve 122 is configured to be positioned on the ledge.

Seat sleeve 122 may be a device that is configured to form a seal against outer housing to limit communication from an inner diameter of high pressure valve to chamber 126, wherein a first end of seat sleeve 122 may be configured to be positioned on the inner ledge of outer housing 121. Seat sleeve 122 may include an outer ledge positioned on the outer diameter of seat sleeve 122 that is configured to reduce an outer diameter of seat sleeve 122.

Seat 124 may be a device that is configured to receive and apply forces against plug 110 based on forces received from spring 128 and hydraulic pressure within chamber 126. Further, seat 124 may be configured to move in a linear plane based on the forces received. Seat 124 may have a distal end that is configured to contact plug, and projection 125 that are configured to reside within chamber 126. When the downstream forces created by spring 128 and the hydraulic pressure are greater than the upstream forces created by downstream assembly 130, then seat 124 may move in a first direction, which may be in a downstream direction. Responsive to seat 124 moving in the first direction, plug 110 may correspondingly move in the first direction. When the upstream forces created by downstream assembly 130 are greater than the downstream forces created by spring 128 and the hydraulic pressure, then seat 124 may move in a second direction, which may be in an upstream direction. Responsive to seat 124 moving in the second direction, plug 110 may correspondingly move in the second direction.

Chamber 126 may be configured to be positioned between an outer diameter of seat sleeve 122 and an inner diameter of outer housing 121. Chamber 126 may be a linear passageway that is configured to house portions of projection 125 and spring 126. Chamber 126 may be a piston that is configured to receive hydraulic fluid to increase the hydraulic pressure within chamber 126 from entry port 140, and emit hydraulic fluid to decrease the hydraulic pressure within chamber 126 via return port 142 to reduce the hydraulic pressure within chamber 126. Responsive to the pressure increasing within chamber 126, the pressure may move seat 124 in the first direction. When seat 124 is moved in the first direction by chamber 126 receiving hydraulic fluid through entry port 140, the size of chamber 126 may dynamically increase. When seat 124 is moved in the second direction via emitting the hydraulic pressure through return port 142, the size of chamber 126 may dynamically decrease.

Spring 128 may be housing within chamber 126. Spring 128 may have a first end fixed on outer ledge of seat sleeve 122, and a second end positioned adjacent to projection 125 of seat 124. Spring 128 may be an elastic object that is configured to store mechanical energy and to provide a constant and continual spring force against projection 125. Responsive to chamber 126 receiving a load from projection 125 that is greater than the spring force, spring 128 may compress. Responsive to releasing the load against spring 128, spring 128 may elongate from the compressed state.

Upstream entry port 140 may be a port that extends through outer housing 121 and into chamber 126. Upstream entry port 140 may be configured to receive hydraulic pressure, via hydraulic fluid, into chamber 126 to increase the pressure within chamber 126. In embodiments, upstream entry port 140 may be utilized to pre-load hydraulic pressure within upstream chamber 126 to a first pressure, wherein the first pressure may be any desired amount. Furthermore, upstream entry port 140 may be configured to receive fluid that was previously stored within a downstream chamber 136 associated with second assembly 130 and/or an external piston. Additionally, upstream entry port 140 may be utilized to communicate fluid with downstream chamber 136.

Upstream return port 142 may be a port that extends through housing 121 and into chamber 126. Upstream return port 142 may be configured to communicate hydraulic pressure to an external piston.

Second assembly 130 may be a downstream assembly that is positioned downstream from plug 110. Second assembly 130 may include an outer housing 131, seat sleeve 132, seat 134, chamber 136, spring 138, downstream entry port 150, and downstream return port 152.

Outer housing 131 may be a device that is configured to house elements of first assembly 130, and control the movement of spring seat 138 via chamber 136.

Outer housing 131 may also include a first passageway that is configured to allow communication with chamber 136 via downstream entry port 150, and a second passageway that is configured to allow communication with chamber 136 via downstream return port 152. Outer housing 131 may include an inner ledge that is configured to reduce the inner diameter of outer housing 131, wherein seat sleeve 132 is configured to be positioned on the ledge.

Seat sleeve 132 may be a device that is configured to form a seal against outer housing to limit communication from an inner diameter of high pressure valve to chamber 136, wherein a first end of seat sleeve 122 may be configured to be positioned on the inner ledge of outer housing 131. Seat sleeve 132 may include an outer ledge positioned on the outer diameter of seat sleeve 132 that is configured to reduce an outer diameter of seat sleeve 132.

Seat 134 may be a device that is configured to receive and apply forces against plug 110 based on forces received from spring 138 and hydraulic pressure within chamber 136. Further, seat 134 may be configured to move in the linear plane based on the forces received. In embodiments, the forces received by seat 134 may be dependent on the forces received by seat 124. Seat 134 may have a proximal end that is configured to contact plug 110, and projection 135 that are configured to reside within chamber 136. When the upstream forces created by spring 138 and the hydraulic pressure within chamber 136 are greater than the downstream forces created by first assembly 120, then seat 134 may move in the second direction, which may be in an upstream direction. Responsive to seat 134 moving in the second direction, plug 110 may correspondingly move in the second direction. When the downstream forces created by first assembly 120 are greater than the upstream forces created by spring 138 and the hydraulic pressure, then seat 134 may move in the first direction, which may be in an upstream direction. Responsive to seat 134 moving in the first direction, plug 110 and seat 124 may correspondingly move in the first direction.

Chamber 136 may be configured to be positioned between an outer diameter of seat sleeve 132 and an inner diameter of outer housing 131. Chamber 136 may be a linear passageway that is configured to house portions of projection 135 and spring 138. Chamber 136 may be configured to receive hydraulic fluid to increase the hydraulic pressure within chamber 136 from entry port 150, and emit hydraulic fluid to decrease the hydraulic pressure within chamber 136 via return port 152. Responsive to the pressure increasing within chamber 136, the pressure may move seat 134 in the second direction. When seat 134 is moved in the second direction, the size of chamber 136 may dynamically increase. When seat 134 is moved in the first direction, the size of chamber 126 may dynamically decrease. In embodiments, chamber 136 may the same or different size to that of chamber 126. In embodiments, a maximum volume associated with chamber 136 may the same or different than a maximum volume associated with chamber 126, wherein controlling the geometries of the respective chambers 126, 136 may allow the pressures within the chambers to be multiplied or drastically changed based on pressure.

Spring 138 may be housing within chamber 136. Spring 138 may have a first end fixed on outer ledge of seat sleeve 132, and a second end positioned adjacent to projection 135 of seat 134. Spring 138 may be an elastic object that is configured to store mechanical energy. In embodiments, spring 138 may be configured to apply a constant and continual spring force against projection 135. Responsive to spring 138 receiving a load from projection 135 that is greater than the spring force, spring 138 may compress. Responsive to releasing the load against spring 138, spring 138 may elongate from he compressed state. In embodiments, spring 138 may be configured to apply the same or a different constant spring force than spring 128.

Downstream entry port 150 may be a port that extends through outer housing 131 and into chamber 136. Downstream entry port 150 may be configured to emit hydraulic pressure, via hydraulic fluid, into chamber 136 to increase the pressure within downstream chamber 136. In embodiments, downstream entry port 150 may be configured to pre-load hydraulic pressure within downstream chamber 136 to a second pressure, wherein the second pressure may be any desired amount. In embodiments, the first pressure may be the same or different pressure than the first pressure. Furthermore, upstream entry port 140 may be configured to receive fluid that was previously stored within a chamber 126 and/or an external piston responsive to upstream chamber 126 decreasing in size.

Downstream return port 152 may be a port that extends through housing 131 and into chamber 136. Downstream return port 152 may be configured to communicate hydraulic pressure to an external piston.

Furthermore, as depicted in FIG. 1, spring 126 and spring 136 are elongated such that seat 124 and seat 134 contact both sides of plug 110.

Figure 2:
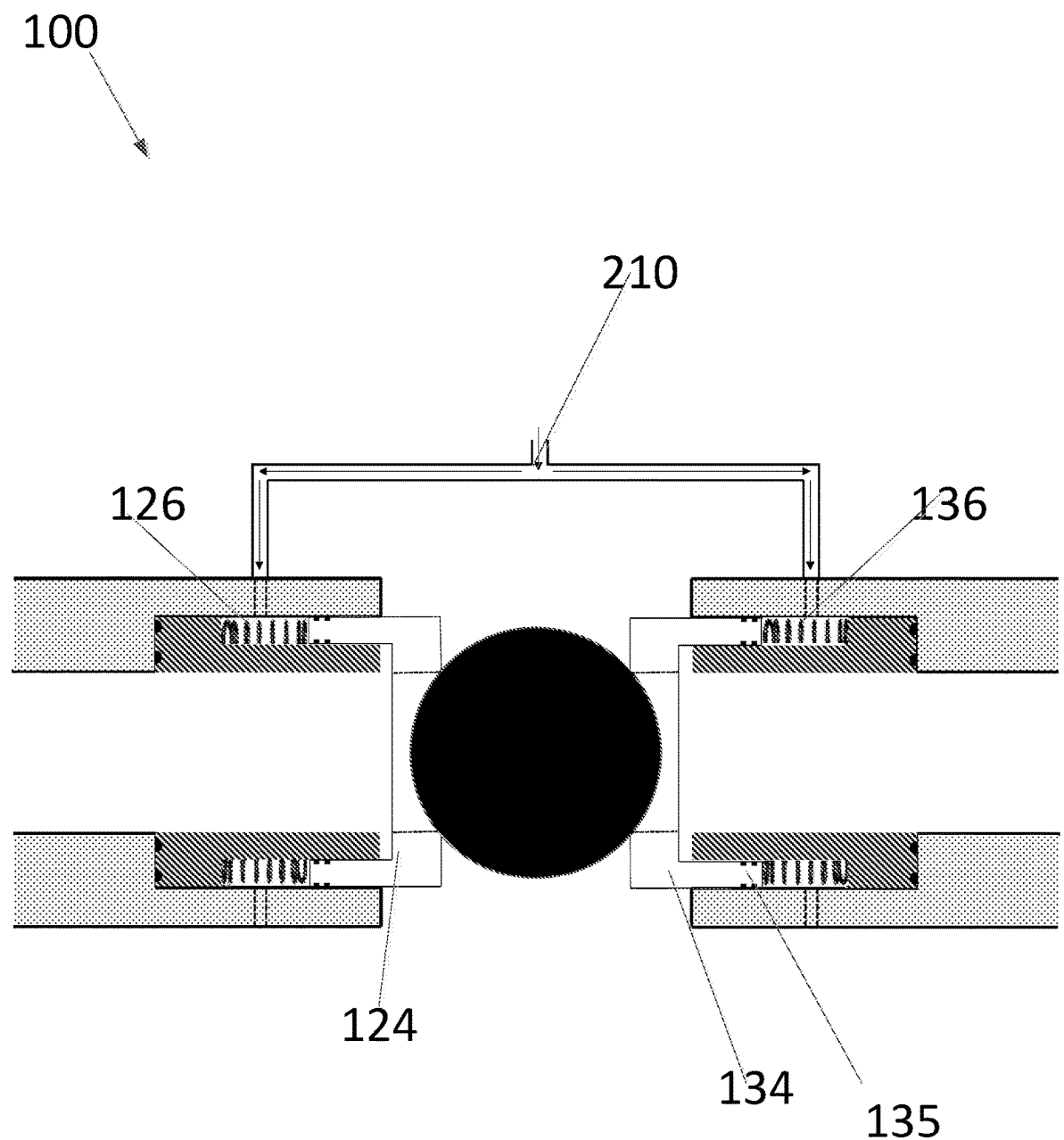
FIG. 2 depicts a preloaded high pressure valve, according to an embodiment.

FIG. 2 depicts a preloaded high pressure valve 100, according to an embodiment. Elements depicted in FIG. 2 may be described above, and for the sake of brevity an additional description may be omitted.

As depicted in FIG. 2, chamber 126 may be in communication to chamber 136 via conduit 210, which allows for the circulation of fluid between the chambers 126, 136. Conduit 210 may also be configured to preload pressure and fluid within chambers 126, 136. A first pressure that is preloaded within chamber 126 and a second pressure that is preloaded with chamber 136 may be determined such that neither inner faces of seats 124, 134 contact the ends of seat sleeve 122, 132, respectively, such that there is a space between the two when there are not forces external to high pressure valve system 100 acting upon plug 100. This space may allow for both seats 124 and 134 to slide responsive to external forces being applied against an upper surface of seat 124 and/or lower surface of seat 134. In embodiments, the first pressure that is preloaded within upstream chamber 124 and the second pressure that is preloaded within downstream chamber 136 may be the same pressure or a different pressure.

In embodiments, conduit 210 may be a closed conduit creating a closed system between first assembly 120 and second assembly 130, which may not allow fluid to enter chambers 126, 136 other than the pre-loaded fluid. Alternatively, conduit 210 may be coupled to an external piston that is configured to dynamically increase and/or decrease a total volume of fluid within chambers 126, 136 based on external forces within the tubing, which may be introduced when fracturing fluid, and corresponding PSI, is applied against seat 124.

Figure 3:
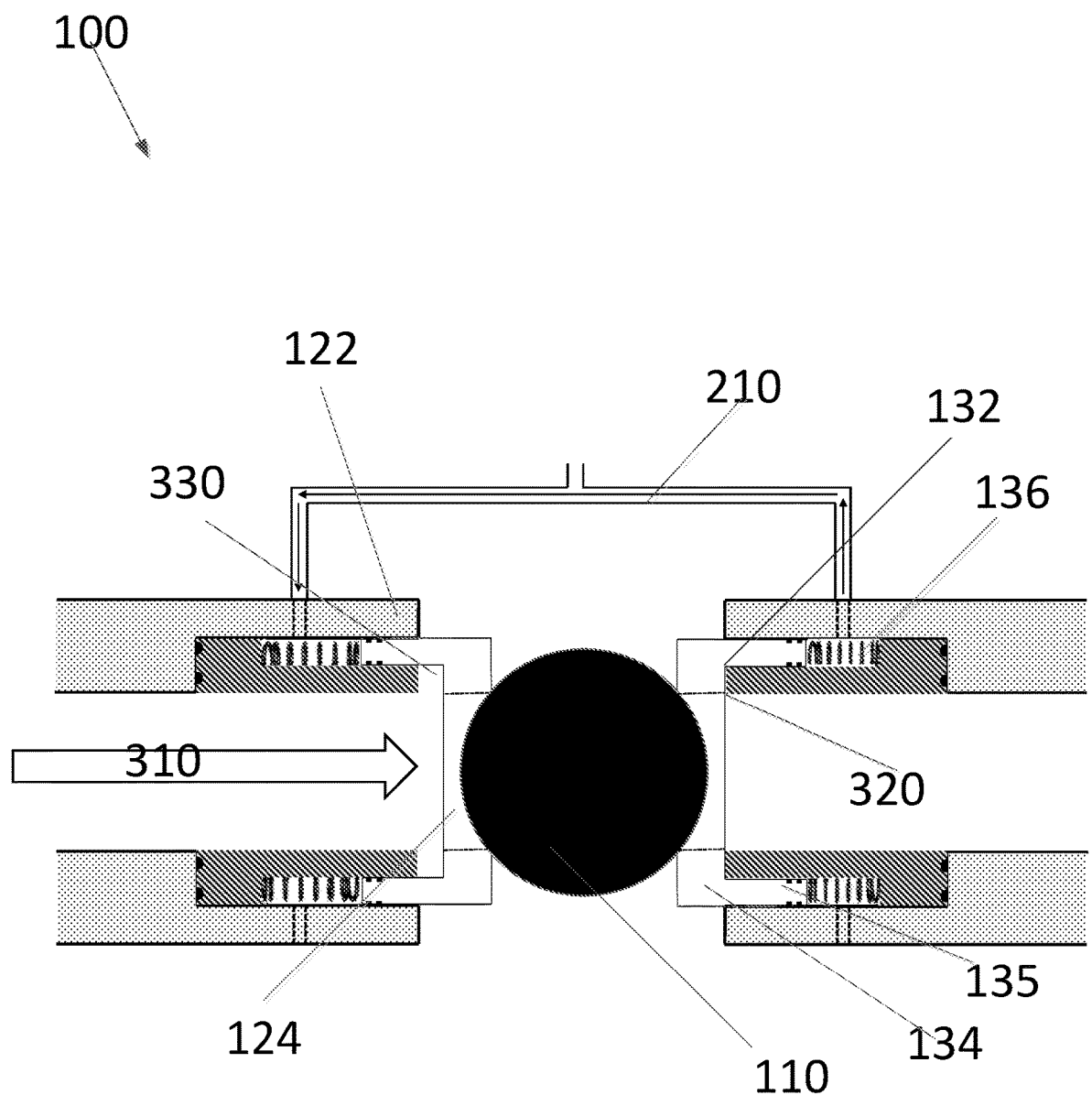
FIG. 3 depicts a high pressure valve interacting with fracturing pressure applied against a seat, according to an embodiment.

FIG. 3 depicts a high pressure valve 100 interacting with fracturing pressure applied against seat 124, according to an embodiment. Elements depicted in FIG. 3 may be described above, and for the sake of brevity an additional description may be omitted.

Fracturing pressure 310 may be introduced upstream from high pressure valve 110 against an upper surface of seat 124. The fracturing pressure may cause a downstream pressure against plug 110, via seat 124, to be greater than an upstream pressure generated by second assembly 130. This may cause upstream assembly 120 to move plug 110, seat 124, and seat 134 downstream, such that there is minimal or no space 320 between seat 134 and seat sleeve 132. Additionally, this may case an increase in space 330 between seat sleeve 122 and seat 124. Responsive to seat 134 moving in a downstream direction, projection 135 may move further into chamber 136 decreasing a volume of chamber 136. Fluid, and the corresponding pressure, within chamber 136 may automatically move into chamber 126 based on the decreasing of volume of chamber 136 via conduit 210. This displacing of fluid and pressure into chamber 126 may also automatically and dynamically impact the upstream pressure generated by first assembly 120 against plug 110. Specifically, this upstream pressure generated by first assembly 120 against plug 110 may increase based on the increase of fluid positioned within chamber 126.

Accordingly, high pressure valve 100 may utilize frac psi to selectively energize a clamping force of seats 124, 126 by controlling the sizing of chambers 126, 136 to increase a piston force behind seats 124, 136. Responsive to an increase in upstream pressure, the clamping force of both seats around the may be dynamically and dependently controlled by displacing fluid within chambers 126, 136 and the volumes of chambers 126, 136.

Figure 4:
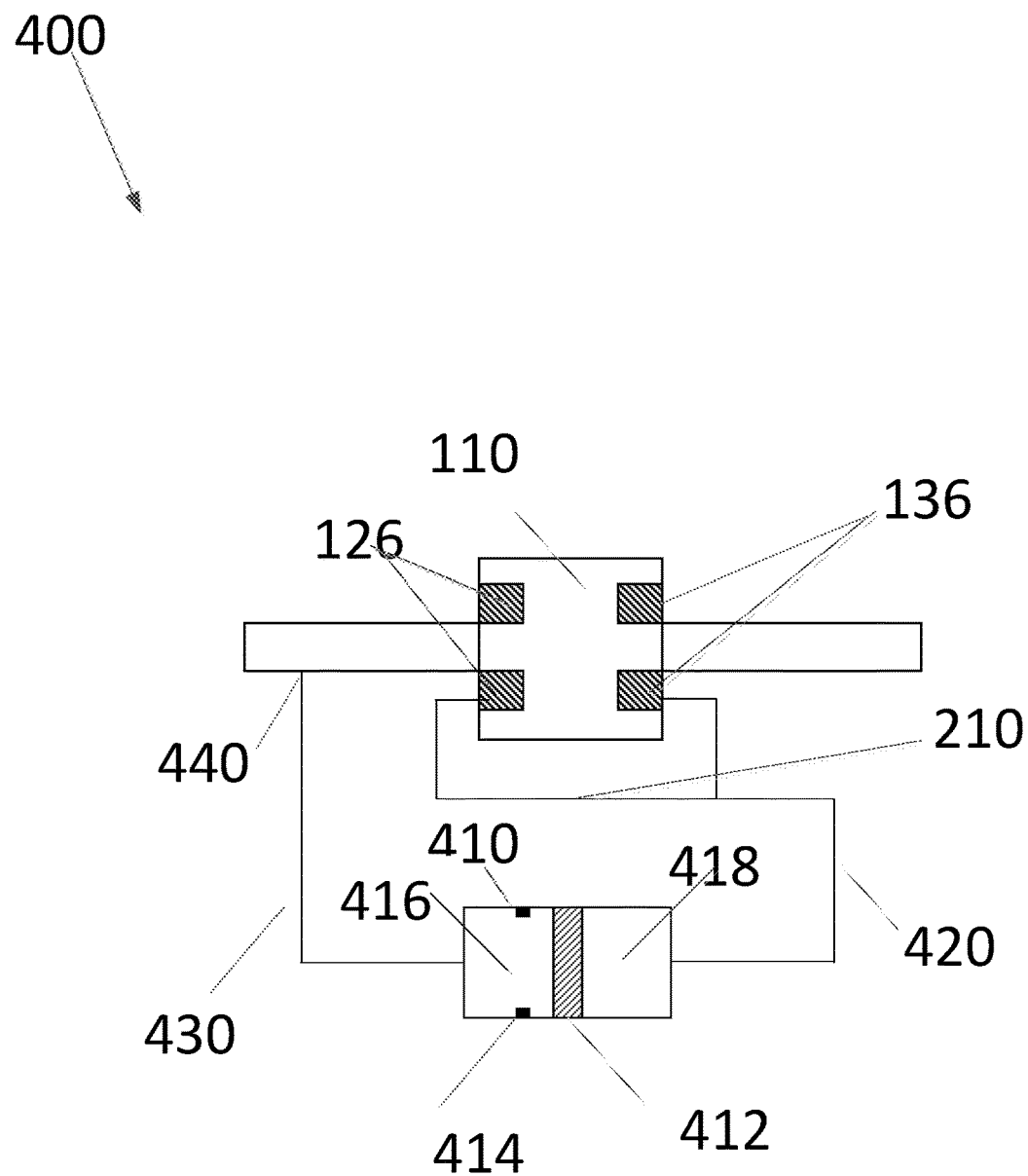
FIG. 4 depicts a high pressure valve system that includes high pressure valve, according to an embodiment.

FIG. 4 depicts a high pressure valve system 400 that includes high pressure valve 400, according to an embodiment. Elements depicted in FIG. 4 may be described above, and for the sake of brevity an additional description may be omitted.

High pressure valve system 400 may include a piston system 410. Piston system 410 may include a piston 412, stops 414, dirty side 416, and clean side 418.

Piston 412 may be a moving component that is configured to move within piston system 410 based on pressures applied to piston 412 by dirty side 416 and clean side 418. Responsive to piston 412 moving towards a distal end of piston system 410, piston 412 may increase a hydraulic pressure applied to chambers 126 and 136 via conduit 210. Responsive to the piston 412 moving towards a proximal end of piston system 410 based on a decrease in pressure from dirty side 416, piston 412 may decrease the hydraulic pressure applied to chambers 126, 136 via conduit 210.

In embodiments, piston 412 may move towards a distal end of piston system 410 based on an increase in pressure from dirty side 416, which may be upstream from high pressure valve 110. As such, piston 412 may utilize fluids utilized for fracturing operations to increase the pressure within chambers 126, 136 without the need for including other outside fluids by dynamically changing the position of piston 412 within piston system 410 to control a volume within clean side 418. In other embodiments, piston 412 may also be additionally controlled based by a user interface that allows a user to control the movement of piston 412 within piston system 410. For example, a user may perform actions on a user interface to move piston 412 towards a distal or proximal end of piston system 410.

Dirty side 416 of piston system 410 may be communicatively coupled upstream from high pressure valve 110 via hosing 430, wherein hosing 430 may include a tie-in point 440 to introduce frac psi into dirty side 416 of piston system 410. This may enable piston system 410 to utilize fluid from a fracturing procedure to move piston 412 within piston system 410.

Clean side 418 of piston system 410 may be communicatively coupled to chambers 126 and 136. Responsive to piston system 410 receiving pressure, the clean fluid may move into chambers 126, 136 via hosing 420. Responsive to piston system 410 relieving pressure, the clean fluid may move outside of the chambers 126, 136. In embodiments, when piston 412 moves towards the distal end of piston system 418, a volume associated with clean side 418 may decrease. This may increase the pressures within chambers 126 and/or 136. When piston 412 moves towards the proximal end of piston system 410, a volume associated with clean side may increase. This may decrease the pressures within chambers 126 and/or 136. Accordingly, a dynamic total amount of pressure within chambers 126 and 136 may be dynamically controlled based on the positioning of piston 412. In embodiments, piston 412 may not be able to completely move towards the proximal end of piston system 410 due to stops 414, which may restrict the movement of piston 412 towards the proximal end of system 410.

In embodiments, the additional fluid may be communicated from clean side 418 into chambers 126, 136 to increase or decrease the pressure within chambers 126, 136 via hosing 420. Hosing 420 may be communicatively coupled to conduit 210, which may allow piston system 410 to amplify or decrease the pressure within chambers 126, 136. This may enable greater bi-directional clamping forces against the plug or decrease the clamping forces against the plug, which may allow the plug to be opened or closed.

Figure 5:
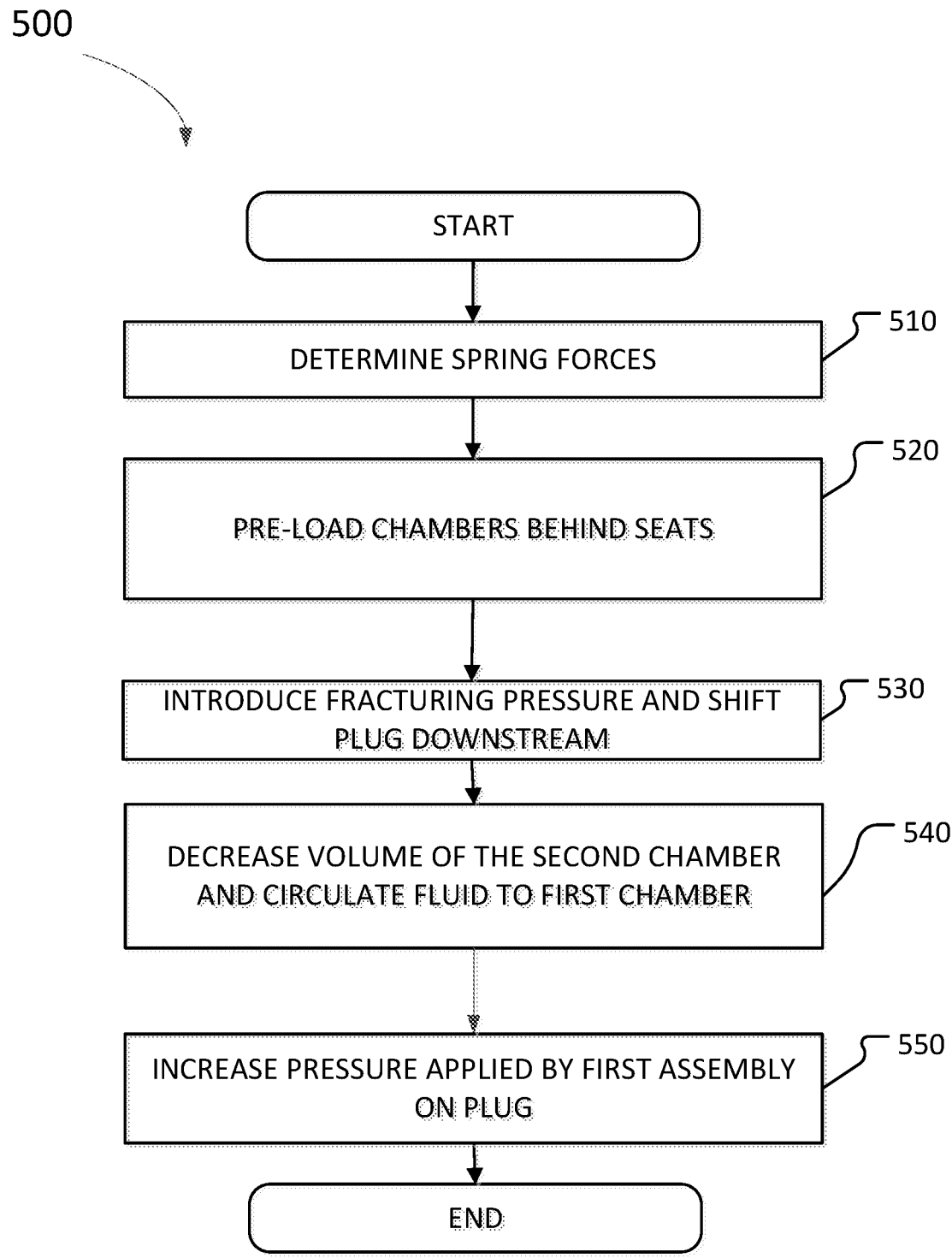
FIG. 5 depicts a method associate with a high pressure valve system, according to an embodiment.

FIG. 5 depicts a method 500 for a high pressure valve system, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a first spring force associated with a first spring of a first assembly, and a second spring force associated with a second spring of a second assembly may be determined. The first spring force apply pressure against a first seat in a downstream direction, while the second spring force may apply pressure against a second seat in an upstream position, wherein the spring forces may be sufficient to enable the first seat of the first assembly and the second seat of the second assembly to contact opposite sides of a plug.

At operation 520, a first hydraulic pressure associated with a first chamber housing the first spring and a second hydraulic pressure associated with a second chamber housing the second spring may be determined. The first hydraulic and the second hydraulic pressure may be determined to provide additional clamping forces on the plug from the first and second seats to balance sufficient clamping forces to engage a metal to metal seal without additional fracturing pressure, but not too much that the high pressure valve would be difficult to open and/or close the valve.

At operation 530, fracturing pressure may be introduced when the valve is in the closed position causing the plug to shift towards the second seat until the seat stops.

At operation 540, responsive to the plug shifting downward, the second chamber may decrease in volume. Hydraulic fluid initially placed within the second chamber may circulate to positioned within the first chamber based on the decrease in size of the second chamber.

At operation 550, the circulated hydraulic fluid, now positioned within the first chamber, may increase the first hydraulic pressure in the first direction against the plug. Furthermore, based on the relative sizing of the first chamber and the second chamber, the circulating of the hydraulic fluid may cause an amplified clamping force against the plug.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A high pressure valve for oil and gas operations comprising:
    a plug configured to rotate between an open position and a closed position, wherein in the open position the plug allows fracturing fluid to flow through tubing, the plug being configured to move along a linear axis when in the closed position;
    a first assembly positioned upstream from the plug, the first assembly including a first seat positioned upstream from the plug and configured to contact the plug, the first seat being configured to move along the linear axis based on receiving forces from the plug, the first assembly including a first chamber configured to generate a first force against the first seat;
    a second assembly positioned downstream from the plug, the second assembly including a second seat positioned downstream from the plug and configured to contact the plug, the second seat being configured to move along the linear axis based on movement of the first seat and receiving forces from the plug, the second assembly including a second chamber configured to generate a second force against the second seat;
    a conduit directly extending from the first chamber to the second chamber, wherein fluid flows through the conduit to control the first force and the second force responsive to movement of the plug on the linear axis and the first seat or second seat receiving the forces from the plug, wherein the first force is inversely related to the second force.

2. The high pressure valve of claim 1, wherein a first volume of fluid within associated with the first chamber is dependent on a second volume of fluid within the associated with a second chamber, wherein the first volume and the second volume dynamically change.

3. The high pressure valve of claim 1, wherein the first force exerted by the first piston being is dependent on the second force.

4. The high pressure valve of claim 1, wherein:
    the conduit extends across the plug.

5. The high pressure valve of claim 4, wherein the conduit provides a closed fluid path between the first chamber and the second chamber.

6. The high pressure valve of claim 1, further comprising:
    hydraulic fluid that is configured to move between the first chamber and the second chamber, wherein a total amount of the hydraulic fluid within the first chamber and the second chamber does not change.

7. The high pressure valve of claim 6, wherein responsive to moving a portion of the hydraulic fluid from the second chamber to the first chamber, the first force will increase and the second force will decrease.

8. A high pressure valve comprising:
    a plug configured to rotate between an open position and a closed position, wherein in the open position the plug allows fracturing fluid to flow through tubing;
    a first assembly positioned upstream from the plug, the first assembly including a first seat positioned upstream from the plug and configured to contact the plug, the first seat being configured to move along a first linear path;
    a second assembly positioned downstream from the plug, the second assembly including a second seat positioned downstream from the plug and configured to contact the plug, the second seat being configured to move along the first linear path based on movement on the first seat;
    a conduit that is configured to allow fluid communication between the first chamber and the second chamber, the conduit extending across the plug;
    an external piston in fluid communication with the conduit, the external piston including a first side and a second side, the first side being configured to receive the fracturing fluid to move the external piston.

9. The high pressure valve of claim 8, wherein when the external piston moves a total amount of hydraulic fluid within the first chamber and the second chamber increases.

10. A method associated with a high pressure valve comprising:
rotating a plug from an open position to a closed position, wherein in the open position the plug allows fracturing fluid to flow through tubing;
positioning a first assembly upstream from the plug, the first assembly including a first seat positioned upstream from the plug and configured to contact the plug;
moving the plug along a liner axis while in the closed position;
moving the first seat along the linear axis, the first assembly including a first chamber configured to generate a first piston force against the first seat;
positioning a second assembly downstream from the plug, the second assembly including a second seat positioned downstream from the plug and configured to contact the plug; and
moving the second seat along the linear axis based on movement on the first seat and based on receiving forces from the plug, the second assembly including a second chamber configured to generate a second piston force against the second seat;
moving fluid through a conduit to control the first force and the second force responsive to movement of the plug on the linear axis and the first seat or second seat receiving the forces from the plug, wherein the first force is inversely related to the second force, wherein the conduit directly communicating coupling the first chamber and the second chamber.

11. The method of claim 10, wherein a first volume of fluid within the first chamber is dependent on a second volume of fluid within the second chamber, wherein the first volume and the second volume dynamically change.

12. The method of claim 10, wherein the first force is dependent on the second force.

13. The method of claim 10, further comprising:
configuring the conduit to extend across the plug.

14. The method of claim 13, wherein the conduit provides a closed fluid path between the first chamber and the second chamber.

15. The method of claim 13, further comprising:
positioning an external piston in fluid communication with the conduit, the external piston including a first side and a second side, the first side being configured to receive the fracturing fluid to move the external piston.

16. The method of claim 15, further comprising:
moving the external piston to increase a total amount of hydraulic fluid within the first chamber and the second chamber.

17. The method of claim 10, further comprising:
moving hydraulic fluid between the first chamber and the second chamber, wherein a total amount of the hydraulic fluid within the first chamber and the second chamber does not change.

18. The method of claim 17, wherein responsive to moving a portion of the hydraulic fluid from the second chamber to the first chamber, the first force will increase and the second force will decrease.

* * * * *